(12) United States Patent
Wang et al.

(10) Patent No.: US 8,802,178 B2
(45) Date of Patent: Aug. 12, 2014

(54) METHOD OF MAKING A HEAT STABLE CHOCOLATE CONFECTIONERY PRODUCT

(75) Inventors: Xiaoying Wang, Hummelstown, PA (US); Julie Hickey, Hummelstown, PA (US)

(73) Assignee: The Hershey Company, Hershey, PA (US)

( * ) Notice: Subject to any disclaimer, the term of this patent is extended or adjusted under 35 U.S.C. 154(b) by 67 days.

(21) Appl. No.: 13/422,101

(22) Filed: Mar. 16, 2012

(65) Prior Publication Data

US 2012/0237665 A1    Sep. 20, 2012

Related U.S. Application Data

(60) Provisional application No. 61/454,006, filed on Mar. 18, 2011.

(51) Int. Cl.
*A23G 1/00*    (2006.01)

(52) U.S. Cl.
USPC .......................................... 426/631; 426/660

(58) Field of Classification Search
USPC ................................. 426/631, 660
See application file for complete search history.

(56) References Cited

U.S. PATENT DOCUMENTS

| | | | |
|---|---|---|---|
| 2,760,867 A | 8/1956 | Kempf et al. | |
| 2,904,438 A | 9/1959 | O'Rourke | |
| 3,218,174 A | 11/1965 | Gian-Franco et al. | |
| 4,446,166 A | 5/1984 | Giddey et al. | |
| 4,880,644 A | 11/1989 | Matsunami et al. | |
| 5,149,560 A | 9/1992 | Kealey et al. | |
| 5,232,734 A | 8/1993 | Takemori et al. | |
| 5,246,727 A | 9/1993 | Finkel | |
| 5,258,199 A * | 11/1993 | Moore et al. | 426/660 |
| 5,505,982 A | 4/1996 | Krawczyk et al. | |
| 5,626,900 A * | 5/1997 | Miller | 426/580 |
| 5,676,995 A * | 10/1997 | Cully et al. | 426/660 |
| 5,709,903 A | 1/1998 | St. John et al. | |
| 5,882,709 A * | 3/1999 | Zumbe | 426/481 |
| 6,221,422 B1 * | 4/2001 | Kruger et al. | 426/631 |
| 6,238,724 B1 * | 5/2001 | Carvallo et al. | 426/631 |
| 6,251,448 B1 | 6/2001 | DeStephen et al. | |
| 6,391,356 B1 * | 5/2002 | Willcocks et al. | 426/306 |
| 6,391,373 B1 * | 5/2002 | Kaiser et al. | 426/631 |
| 6,706,307 B2 * | 3/2004 | Armstrong et al. | 426/584 |
| 2006/0051488 A1 | 3/2006 | DeMuijnck | |

FOREIGN PATENT DOCUMENTS

| | | | |
|---|---|---|---|
| EP | 1733625 A1 | 6/2005 | |
| EP | 1969948 A1 | 12/2008 | |
| JP | 56169546 | 12/1981 | |
| JP | 08-89173 | * 4/1994 | |
| JP | 10-150916 | * 11/1996 | |
| JP | 10150916 | * 11/1998 | |
| JP | 2000125768 A | 5/2000 | |
| WO | 9945788 | 3/1999 | |
| WO | 2007112077 A2 | 3/2007 | |
| WO | 2008007938 A1 | 4/2007 | |
| WO | 2009012929 A2 | 7/2008 | |
| WO | 2010143067 A1 | 6/2010 | |

OTHER PUBLICATIONS

T. Stortz & A. Marangoni, "Heat Resistant Chocolate", Trends in Food Science & Technology, Feb. 2011, pp. 1-14.
Terri A. Stortz and Alejandro G. Marangoni, Heat Resistant Chocolate, Trends in Food Science & Technology, Feb. 1, 2011, 27 pp.
Persis J. Subramaniam, Minstpkg, Olive C. Burke, J. U. Kristott, Kathleen H. M. Groves and Sylvia A. Jones, Heat-resistant Chocolate, The British Food Manufacturing Industries Research Association, Research Reports, Apr. 1994, No. 710, 33 pp. Surrey, England.

* cited by examiner

*Primary Examiner* — Carolyn Paden
(74) *Attorney, Agent, or Firm* — McNees Wallace & Nurick LLC

(57) ABSTRACT

A method of producing a heat resistant chocolate confectionery product is disclosed. The method provides for such products to be made without the addition of water and which can be made with traditional chocolate making ingredients to yield a dough. The dough retains its shape above the melting point of fats in the product, while the product still retains a flavor and mouthfeel comparable with chocolate made by traditional methods.

19 Claims, No Drawings

METHOD OF MAKING A HEAT STABLE CHOCOLATE CONFECTIONERY PRODUCT

RELATED APPLICATIONS

This application claims the benefit of and priority to U.S. Provisional Application No. 61/454,006 filed Mar. 18, 2011.

FIELD

This application is directed to the manufacture of confectionery products and more particularly to the manufacture of heat stable chocolate and chocolaty candy.

BACKGROUND

Traditional chocolate making methods are well known and involve several basic steps carried out in a particular order. Generally, the process starts with cocoa beans harvested from pods of melon-like fruit that grow on the cacao tree. The cocoa beans are removed from the pods and placed in large heaps or piles to ferment, during which the shells of the beans harden and darken and a rich cocoa flavor develops.

Dried cocoa beans are roasted at very high temperatures and hulled to separate the shell from the inside of the bean, also called a "nib," the part of the bean actually used to make chocolate. The nibs are milled by a grinding process that turns the nibs into a liquid called chocolate liquor.

The chocolate liquor, which is sometimes separated in advance into its constituents, cocoa butter and cocoa powder, is mixed with a sweetener, usually sugar, and in the case of milk chocolate, milk solids are also added.

The chocolate liquor is also combined with milk and sugar and is dried to a coarse, brown powder called chocolate crumb. Additional cocoa butter may be added to the chocolate crumb, after which the mixture passes through steel rollers which refine the mixture above the melting point of the cocoa butter, resulting in a chocolate powder. The chocolate powder is then conched, a process in which the chocolate powder is maintained above the fat melting temperature while mixing elements smooth out gritty particles, remove moisture and off-flavors, and develop pleasant flavors. Conching also releases fat from the chocolate powder, increasing the fat coating on the particles so that the chocolate has a proper fluidity for further processing. Additional fat is added to achieve the full formulated fat content and emulsifiers are also added to reduce viscosity and enhance fluidity of the chocolate paste. The liquid chocolate paste is tempered and then poured or deposited into a mould to produce a chocolate bar or used for enrobed products.

The melting temperature of cocoa butter and other fats sometimes used with or in place of cocoa butter in certain chocolate making processes is in the range of 29° C. to 35° C. As a result, chocolate bars and other chocolate confections cannot always be readily transported, stored or enjoyed in the summertime or in tropical climates where temperatures of unconditioned spaces typically reach or exceed the melting point of the fat in the chocolate. Even where the confections are stored or consumed in a conditioned space, if they melt during transit and then resolidify, the products may become misshapen or exhibit bloom, a condition in which the melted fat in the chocolate recrystallizes in a different structure resulting in a change in appearance or texture that can render the product unappealing.

Various attempts have been directed to trying to develop a heat stable chocolate that could better withstand conditions of elevated temperature. Efforts to date have generally involved modifying formulations by adding ingredients to the chocolate that provide heat stability. In some cases, special ingredients are added that are designed to absorb moisture during processing or after packaging. In other cases, water is incorporated directly into the chocolate during manufacture, such as using water-oil emulsions. However, chocolate products made using these kinds of additional ingredients generally have a dry, crumbly texture that is undesirable and also suffer from flavor deterioration over a shorter shelf life as a result of the high moisture content. In still other cases, high melting fats have been used, but chocolate confections having these kinds of fats are also disfavored because they tend to have a negative, waxy eating quality.

These and other drawbacks are associated with current methods of confectionery production.

SUMMARY

Exemplary embodiments are directed to producing chocolate confectionery products that do not need to be specially formulated and can be made with traditional chocolate making ingredients, but which still exhibit heat stable characteristics. Methods in accordance with exemplary embodiments result in a chocolate confectionery product having a rheology such that the product retains its shape above the melting point of fats in the product, while retaining a flavor and mouthfeel comparable with chocolate made by traditional methods.

In one embodiment, a method for creating a confectionery product comprises providing a mixture comprising a chocolate compatible fat and a sweetener; thereafter refining the mixture to form a powder having a predetermined average particle size; thereafter agitating the refined powder mixture at a temperature above the melting temperature of the chocolate compatible fat to form a dough; and thereafter solidifying the dough to form a confectionery product.

In another embodiment, a method for creating a confectionery product comprises providing a mixture comprising a chocolate compatible tempering fat, milk, cocoa solids and sugar; thereafter refining the mixture to form a chocolate powder having an average particle size in the range of about 10 to about 30 microns at a temperature less than the melting temperature of the chocolate compatible tempering fat; thereafter agitating the refined chocolate powder mixture at a temperature above the melting temperature of the chocolate compatible tempering fat to form a dough; tempering the dough in the presence of greater than about 0.3% by weight tempering seed; forming the dough into a predetermined shape; and thereafter solidifying the dough to form a confectionery product. The amount of fat present in the mixture being refined is about 29% by weight or greater.

In yet another embodiment, a method for creating a confectionery product comprises providing a mixture comprising cocoa solids, sugar, milk fat, and a chocolate compatible fat selected from the group consisting of cocoa butter replacements, cocoa butter substitutes and combinations thereof; thereafter refining the mixture to form a chocolate powder having a predetermined average particle size; thereafter agitating the refined chocolate powder mixture at a temperature above the melting temperature of the chocolate compatible fat to form a dough; thereafter forming the dough into a predetermined shape; and thereafter solidifying the dough to form a confectionery product.

In still another embodiment, a heat stable confectionery product is provided that includes cocoa solids, milk solids, sugar, and a chocolate compatible fat, wherein the chocolate compatible fat has a melting temperature in the range of about 29° C. to about 35° C., and wherein the product has a smooth texture and a shelf life up to at least 6 months at temperatures above 32° C. Any other ingredients are present in amounts that do not interfere with the product's ability to form a dough above the melting temperature of the fat.

An advantage is that chocolate confectionery products produced in accordance with exemplary embodiments have a rheology such that the product maintains its shape above the melting temperature of the fat in the chocolate, without becoming messy or liquid-like.

Another advantage is that chocolate confectionery products produced in accordance with exemplary embodiments can be formulated with the same as or less than the overall fat content as chocolate confectioneries produced by traditional methods.

Yet another advantage is that methods in accordance with exemplary embodiments can produce chocolate confections using traditional chocolate making ingredients and avoid the kind of additives previously used to create heat stable chocolate that result in undesirable eating qualities and poor shelf life.

Still another advantage is that methods in accordance with exemplary embodiments can produce chocolate confections that have a stable texture at elevated temperatures, but still having a taste and texture, as well as shelf life, comparable to chocolate confections produced by traditional methods.

Other features and advantages of the present invention will be apparent from the following more detailed description of exemplary embodiments, which illustrate, by way of example, the principles of the invention.

DETAILED DESCRIPTION OF EXEMPLARY EMBODIMENTS

Exemplary embodiments are directed to methods of producing a confectionery product that does not need to be specially formulated and can be made with traditional chocolate making ingredients, but which still exhibits heat stable characteristics and does so with comparable taste and mouthfeel of chocolate made by traditional methods. Exemplary embodiments include sequential steps of providing a blended mixture followed by refining and agitating/kneading to obtain a chocolate dough that can be shaped and solidified to form the confectionery product.

It will be appreciated that the term "chocolate" may have a legal definition in certain countries relative to particular amounts of cocoa solids, cocoa butter or other ingredients, such as milk fat and/or milk powder, and that the definition may vary from country to country. As used herein, however, the term "chocolate confection" or "chocolate confectionery product" is meant to encompass the broad category of any confectionery product that includes a chocolate compatible fat, including traditional chocolate containing cocoa solids and cocoa butter, as well as those products sometimes referred to as chocolaty candy or chocolate compound that make use of additional fats and/or chocolate flavorings in place of cocoa solids and/or cocoa butter, along with the category of candy known as white chocolate.

According to exemplary embodiments, a blended mixture of a chocolate compatible fat and a sweetener is provided, which is sometimes referred to as batching. Typically, the mixture further includes cocoa solids, but which may be eliminated, for example, in methods for producing white chocolate. The cocoa solids may be introduced, for example, as cocoa powder and/or as chocolate liquor in which the cocoa solids are not yet separated from the cocoa butter.

The sweetener is typically, but not necessarily, sugar. Preferably, the sweetener is a dry sweetener, although the use of other alternatives is not precluded. Other sweeteners may include polyols, corn syrup solids, and fructo-oligosaccharide/inulin, by way of example only.

The chocolate compatible fat is preferably cocoa butter, but may also be any of the vegetable or other fats known in the chocolate industry for use in combination with or in place of cocoa butter. Such fats are typically classified as one of the following categories: cocoa butter equivalents (e.g., fractionated palm oil, illipe and shea nut butter), cocoa butter replacements (e.g., fractionated and partially hydrogenated soybean, cottonseed and palm oils) and cocoa butter substitutes (e.g., fractionated and partially hydrogenated lauric fat compounds). The chocolate compatible fat may be any of the foregoing categories of fats or may be a combination of one or more types of fats from different categories.

As already noted, in some embodiments, chocolate liquor may be used to introduce both cocoa solids and cocoa butter; in that case, additional chocolate compatible fat may be blended into the mixture to achieve the desired total fat content. When chocolate confections are made using chocolate liquor as part of the formulation, the chocolate liquor may contain high levels of unpleasant notes and the mixture may be subjected to a pre-refining conch process. The conch process involves mixing the blended mixture at elevated temperatures (above the fat melting temperature) for several or more hours, e.g. at 50° C. for 3 hours, to remove off notes and develop pleasant flavors.

The total formulated fat content may include both chocolate compatible fats and milk fat. In some embodiments, the total formulated fat content of the chocolate confection may be between about 25% to about 36% by weight, typically greater than about 26% by weight, such as greater than about 28% by weight, and more typically in the range of about 29% to about 32% by weight. The total fat content in the blended mixture contains 80%-100% of the total formulated fat in the confectionery product to be produced. More typically, the blended mixture contains 95%-100% of the total formulated fat, such that the amount of fat in the mixture entering the refiner is substantially the same as the fat in the final product. The balance of any remaining fat may be added as tempering seeds. In some embodiments, particularly in confections where no tempering is needed, the total fat content in the blended mixture is the same as the final fat content of the product to be produced, such that the amount of fat introduced to the refiner is substantially the same as the amount of fat in the finished chocolate confection.

For embodiments such as white chocolate and milk chocolate confections, milk may be blended into the mixture. The milk may be provided as powdered milk; alternatively, liquid milk may also be used but which may introduce an intermediate drying step to remove excess moisture prior to refining. Furthermore, the powdered milk may contain fat or may be nonfat. In those embodiments in which the milk contains fat, the amount of chocolate compatible fat may be adjusted to maintain the total formulated fat content within the desired range. It will further be appreciated that in some embodiments, such as in the manufacture of dark chocolate confections, it may be desirable to provide milk fat but not milk solids. In such cases the amount of chocolate compatible fat may be adjusted to maintain the total formulated fat content within the desired range. In some embodiments, additives such as soy protein, rice flour and the like may be added in addition to or in place of milk solids.

One of the advantages achieved with exemplary embodiments is that the blended mixture can be any desired chocolate confection formulation and uses traditional chocolate ingredients. It will thus be appreciated that the amounts of cocoa, sugar or other sweetener, chocolate compatible fat, and/or milk (including milk fat and/or milk solids) can be added in such proportions to achieve any desired flavor characteristics.

It will further be appreciated that flavorants, such as natural vanilla, vanillin or other extracts, as well as preservatives, such as tocopherols, and other minor ingredients used in traditional chocolate formulations may also be blended into the mixture. The use of emulsifiers such as lecithin, polyglycerol polyricinoleate (PGPR), and ammonium phosphatide (YN), for example, is generally desired to be avoided and exemplary embodiments typically contain about 0.3% by weight or less, preferably about 0.2% by weight or less, and more preferably about 0.1% by weight or less of emulsifiers. It will be appreciated, however, that higher amounts of emulsifiers are not necessarily precluded, provided the emulsifiers do not interrupt the ability of the mixture to form a dough as discussed subsequently in more detail.

The provided mixture, having the types and amounts of ingredients according to a particular confection formulation, is blended above the melting temperature of the chocolate compatible fat to obtain a thorough mixing, following which the mixture is refined. The refining results in decreased particle size of the mixture, generally in the range of about 10 to about 30 microns, preferably in the range of about 20 to about 30 microns. The reduction of particle size increases the surface area of the non-fat ingredients. More free fats are trapped to the newly formed surface, resulting in a dry chocolate powder from the liquid blend introduced to the refiner.

Refining can be accomplished using conventional refining equipment. The refine temperature can be above, at, or below the melting temperature of the chocolate compatible fat, which may depend on the total fat content of the mixture introduced to the refiner. As described, some exemplary embodiments use a higher fat content in the mixture to be refined, in which nearly the full formulated fat content of the confectionery product is present prior to refining. This mixture has a lower viscosity and a lower refine temperature may be employed. In accordance with certain such exemplary embodiments, the refining temperature is typically carried out at a temperature less than the melting temperature of the chocolate compatible fat, preferably at least about 10° C. less than melting temperature of the fat. In some embodiments, the refining is carried out at 15° C. to 20° C. Lowering the refining temperature has a tendency to increase the refined throughput, especially when chocolate is formulated at higher fat contents, such as at 28% by weight or above, and in some embodiments 30% by weight or above.

However, in other embodiments, particularly those in which the total formulated fat content is less than about 26% by weight and/or where some fat content is contained within the milk solids or is otherwise not free to coat the particles, it may be desirable to refine the mixture at or above the melting temperature of the fat.

In traditional chocolate making processes, output from the refiner is conched at elevated temperature for several hours during which time fat is released from refined chocolate powder, coated onto all of the refined particles, and the remaining fat to reach the final fat content is added along with emulsifiers to obtain a final flowable liquid chocolate that has a Bingham or pseudoplastic-like fluid behavior.

Conversely, according to exemplary embodiments, the post-refined mixture is instead subjected to gentle agitation via a slow kneading process carried out at or above the melting temperature of the chocolate compatible fat to obtain a dough. The kneading stops when the post-refined material forms a non-flowable chocolate dough, which may take anywhere from about 5 or 10 minutes up to several hours depending on the fat content of the refined mixture being kneaded. In some exemplary embodiments in which the fat content is not fully formulated fat prior to refining, the remaining fat can be added during the dough forming stage.

The conclusion of the kneading process is reached when the post-refined mixture reaches the dough stage. Overkneading can modify the rheology from the desired dough stage to a more liquid-like paste like that in traditional chocolate processing. Nuts, coconut, and other types of inclusions commonly incorporated into chocolate confections can be added during kneading to incorporate these additional ingredients into the end product. While the distinction between a dough formed according to the processes described in accordance with exemplary embodiments and a flowable paste or liquid formed in accordance with traditional chocolate making methods will be readily apparent to those of ordinary skill in the art, the dough may further be characterized as exhibiting a minimum resistance force of $1.5 \times 10^4$ Pa under a compression deformation of 2.5 mm at 0.2 mm/sec penetration speed using a 0.25 inch diameter plastic cylindrical probe at 45° C., or a minimum peak force of 50 grams using TA-XT2 Analyser under those conditions.

Because exemplary embodiments are directed to forming a chocolate dough prior to final piece forming of the chocolate confection, only a partial release of the incorporated fat occurs during the limited agitation after refining to reach the dough stage. In general, a firmer dough can be achieved by reducing the amount of mixing, resulting in less incorporated fat released and a higher heat stability of the chocolate confection. Because the dough and its viscoelastic-like rheology contributes to the heat stability of the chocolate confection, the use of emulsifiers in excess of about 0.3% should generally be avoided, especially when it is formulated at high level of fat content, such as 29% or above and moisture content 1.2% or less. Emulsifiers in excess of this amount may have a tendency to result in the dough taking on the characteristics of a liquid chocolate paste and reducing its heat stability.

In embodiments in which the chocolate compatible fat is or includes a tempering fat, the chocolate dough may be tempered by adding pre-made tempering seeds at 0.2% by weight or greater, typically 0.5% by weight or greater and preferably 1.0% by weight or greater. The tempering seeds may be powder of chocolate, cocoa butter, or another tempering fat, and as such may contribute to the total formulated fat content. The seeds are incorporated into the dough during kneading, which incorporation should be carried out at a temperature sufficient so that the seeds do not melt entirely away and lose their crystal structure, typically in the range of about 27° C. to about 33° C., preferably about 29.5° to about 31° C. In some embodiments, this may be achieved by kneading above this temperature range at early stages of kneading, followed by cooling to this range and adding the seeds and thereafter further kneading the seeds into and holding the dough in this temperature range in the presence of the seeds to achieve the desired crystalline structure. In other embodiments, the kneading may occur within this temperature range so that an additional cooling step is not needed prior to addition of the tempering seeds.

The resultant chocolate dough can then be shaped and solidified to form the chocolate confectionery product. Because the chocolate dough is not flowable, it is formed into its shape for ultimate consumption other than by the liquid depositing or enrobing used in traditional chocolate making. The chocolate dough can be formed into pieces of any desired shape by any suitable shaping methods such as rotary molding, sheeting, extrusion, depositing, drop rolling, stamping, frozen cone, or panning all by way of example.

In one embodiment, a rotary moulding machine may be used to shape and form the chocolate confectionery product. The moulding machine includes a water jacketed roll to which a die of a desired shape is mounted. The roll temperature may be controlled within the chocolate dough working range, typically 27° C.-to 33° C. for tempered chocolate and more preferably 29.5° C. to-31° C. For embodiments in which a non-tempering chocolate compatible fat is employed, the dough working range may be any suitable temperature at or above the fat melting temperature and the roll temperature may be controlled accordingly.

After forming into the desired piece shape, the chocolate confection may then be cooled in a cooling tunnel or other conventional technique for piece solidification. In some embodiments, it may be desirable to apply a confectionery glaze or shellac over the pieces after shaping, either prior to or after solidification.

Chocolate confectionery products made in accordance with exemplary embodiments of the invention employ chocolate dough having a firm, pliable rheology formed above the melting temperature of the chocolate compatible fat used to create the confection. As a result, that is the rheology to which the chocolate confection reverts if the confection is subsequently heated back above the fat melting temperature, as might be the case in hot weather and/or tropical climates.

Chocolate confections made in accordance with exemplary embodiments exhibit good heat stability and under such conditions are capable of retaining their shape and can be picked up without leaving a significant chocolaty residue on surfaces they touch, as is associated with the mess left when chocolate melts that is made by traditional methods. Furthermore, chocolate confections made in accordance with exemplary embodiments have a shelf life of at least six months, even at temperatures of 32.2° C. or above. In addition to advantages associated with heat stability, unlike known heat resistant chocolate products, chocolate confections made in accordance with exemplary embodiments have a smooth, non-grainy texture, with a mouthfeel and taste comparable to chocolate made by traditional methods which do not have heat resistant qualities.

EXAMPLES

The invention is further described in the context of the following examples, which are presented by way of illustration, not of limitation.

Example 1

A heat stable chocolate confection was made by blending the ingredients in the weight percentages according to the formula set forth below; the formulated mixture had a total fat content of 28.4% by weight.

| | |
|---|---|
| Cocoa liquor | 10.73 |
| Sugar | 46.8 |
| Whole milk powder | 27.6 |
| Cocoa butter | 14.8 |
| Lecithin | 0.05 |
| Vanillin | 0.02 |

All ingredients were weighed into a Hobart bowl and mixed well at 38° C. The mixture was then refined to a particle size in the range of about 25-30 microns with the refiner setting at 35° C., above the melting point of the cocoa butter. The mixture was refined above the melting temperature of the cocoa butter because the amount of free fat was reduced by the use of whole milk powder to supply some of the total formulated fat. The refined material was agitated to knead it for 6 hours while being heated to a temperature in the range of about 55°-60° C. A non-flowable dough was obtained at the end of the kneading.

A small amount of chocolate (about 2% by weight) was hand tempered to form chocolate seeds. Near the end of the mixing process, the dough was cooled to 30° C. and the chocolate seeds were added. Mixing was continued at that temperature until the seeds were uniformly distributed into the chocolate dough. The chocolate dough was then pressed into a mould, cooled in a refrigerator for approximately 30 minutes and then demolded.

Example 2

A heat stable chocolate confection was made by blending the ingredients in the weight percentages according to the formula set forth below; the formulated mixture had a total fat content of 31% by weight.

| | |
|---|---|
| Cocoa powder | 12.6 |
| Sugar | 45.285 |
| Nonfat milk powder | 12.6 |
| Cocoa butter | 29.5 |
| Vanillin | 0.015 |

All ingredients were weighed into a Hobart bowl and mixed well at about 33° C. The mixture was refined to a particle size in the range of about 20-25 microns with refiner setting at 10° C., below the melting temperature of the cocoa butter. The refined material was kneaded above the melting temperature of the cocoa butter, at about 33° C., to form a nonflowable chocolate dough. The chocolate dough was tempered by the addition of 1% by weight tempered chocolate seeds and was molded, cooled, and demolded as described in Example 1.

Example 3

A heat stable chocolate confection was made by blending the ingredients in the weight percentages according to the formula set forth below; the formulated mixture had a total fat content of 31% by weight.

| | |
|---|---|
| Cocoa powder | 8.3 |
| Sugar | 46.68 |
| Nonfat milk powder | 15.0 |
| Cocoa Butter Substitute | 30.0 |
| Vanillin | 0.02 |

All ingredients were weighed into a Hobart bowl and mixed well at about 35° C., in which the cocoa butter substitute (CBS) was a fractionated hydrogenated palm kernel oil with a melting temperature in the range of 33.5 to 35.5° C. The mixture was refined to a particle size of 20-25 microns with the refiner setting at 15° C., below the melting temperature of the CBS. The refined material was kneaded above the melting temperature of the CBS, at about 49° C., to form a nonflowable dough. Because the CBC was a non-tempering fat, the dough was then directly molded, cooled, and demolded into pieces, as described in Example 1, without tempering or the addition of chocolate seeds.

The chocolate confections formed in Examples 1 through 3 were subjected to a heat resistance test to determine their heat stability. A conventional Hershey's milk chocolate snack bar was used to provide a baseline comparison, which was of the same size and shape of the pieces molded in the Examples.

The heat resistance test was carried out using a TA-XT2 Texture Analszer. The test pieces were held at a test temperature above the melting temperature of the fat, e.g. 38° C., for at least 30 minutes and in some cases up to 5 hours or longer. A 0.25 inch diameter plastic cylindrical probe was pressed 2.5 mm deep into the piece at a rate of 0.2 mm/sec and the resistance force was recorded in grams (g) at the maximum peak height.

The chocolate piece of Example 1 had a peak height of 440 g when tested at 38° C. after having been held at that temperature for five hours. The chocolate piece of Example 2 had a peak height of 500 g at 49° C. after having been held at that temperature for three hours. The chocolate candy piece of Example 3 had a peak height of 400 g at 49° C. after having been held at that temperature for three hours.

All of the products formed in Examples 1-3 retained their shape and could be easily picked up without leaving any significant amounts of chocolate residue.

The comparative example exhibited less than 10 g of resistance force at a temperature above 38° C., failed to retain its shape upon being picked up, and left significant amounts of melted chocolate on the surface.

At ambient temperatures, the products of the Examples otherwise exhibited the same characteristics as the conventional example, including ease of breakability. The Example products also exhibited a creamy mouthfeel and taste comparable to the conventional chocolate bar when consumed.

Example 4

A heat stable white chocolate confection was made by blending the ingredients in the weight percentages according to the formula set forth below; the formulated mixture had a total fat content of 33% by weight.

| Milk Fat | 11 |
| Sugar | 42 |
| Whole milk powder | 27.6 |
| Cocoa Butter | 14.4 |
| Vanillin | 0.02 |

All ingredients were weighed into a Hobart bowl and mixed well at about 35° C. The mixture was refined to a particle size of 15-20 microns with the refiner setting at 15° C., below the melting temperature of the fats. The refined material was kneaded above the melting temperature at about 45° C., to form a nonflowable dough.

A piece of sheeted chocolate in accordance with this embodiment exhibited a 190 g peak force at 45° C. when subjected to the heat resistance test previously described with respect to Examples 1-3.

Example 5

A heat stable chocolate confection was made using the formula set forth below. Cocoa liquor and nonfat milk powder was conched for 5 hours at 70° C. to remove off-flavor from cocoa liquor and develop pleasant flavors. After conching, the rest of ingredients in the formula were added and the mixture was refined at 35° C. to about 20 micron. The refined material was kneaded into a dough that was subsequently tempered by adding 1% by weight tempered cocoa butter seeds at 29.4° C. The final chocolate contained 29.7% by weight total fat.

| Cocoa liquor | 10.73 |
| Nonfat milk powder | 10.0 |
| Sugar | 43.85 |
| Whole milk powder | 17.6 |
| Cocoa butter | 14.8 |
| Milk fat | 3.0 |
| Vanillin | 0.02 |

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for creating a confectionery product comprising:
providing a mixture comprising a chocolate compatible fat and a sweetener and containing less than 0.3% by weight emulsifiers; thereafter
refining the mixture to form a powder having a predetermined average particle size; thereafter
agitating the refined powder mixture at a temperature above the melting temperature of the chocolate compatible fat to form a dough; and thereafter
solidifying the dough to form a confectionery product,
wherein the provided mixture comprises chocolate liquor and the method further comprises conching the mixture prior to the step of refining.

2. The method of claim 1, wherein the amount of fat present in the mixture being refined is substantially the same as the amount of fat present in the formed confectionery product.

3. The method of claim 1, further comprising forming the dough into pieces intermediate the steps of agitating and solidifying.

4. The method of claim 1, wherein the provided mixture further comprises milk.

5. The method of claim 4, wherein the milk is provided as powdered milk.

6. The method of claim 1, wherein the step of refining is accomplished below the melting temperature of the chocolate compatible fat.

7. The method of claim 1, wherein the chocolate compatible fat is a tempering fat.

8. The method of claim 7, wherein the method further comprises tempering the dough in the presence of greater than about 0.3% by weight tempering seed intermediate the steps of agitating and solidifying.

9. The method of claim 1, wherein the chocolate compatible fat comprises a fat selected from the group consisting of cocoa butter, cocoa butter equivalents, cocoa butter replacements, cocoa butter substitutes, and mixtures thereof.

10. The method of claim 1, wherein the step of refining comprises refining a mixture having a fat content greater than 29% by weight.

11. A method for creating a confectionery product comprising:

providing a mixture comprising a chocolate compatible tempering fat, milk, cocoa solids and sugar and containing less than 0.3% by weight emulsifiers; thereafter refining the mixture to form a chocolate powder having an average particle size in the range of about 10 to about 30 microns at a temperature less than the melting temperature of the chocolate compatible tempering fat;

agitating the refined chocolate powder mixture at a temperature above the melting temperature of the chocolate compatible tempering fat to form a dough; thereafter tempering the dough in the presence of greater than about 0.3% by weight tempering seed;

forming the dough into a predetermined shape; and thereafter solidifying the dough to form a confectionery product, wherein the amount of fat present in the mixture being refined is about 29% by weight or greater.

12. The method of claim 11, wherein the chocolate compatible tempering fat comprises cocoa butter or a cocoa-butter equivalent.

13. The method of claim 12, wherein the step of agitating occurs at a temperature of about 32° C. or greater.

14. The method of claim 11, wherein the step of refining occurs at a temperature of about 25° C. or lower.

15. The method of claim 11, wherein the step of tempering occurs in the presence of greater than about 1% by weight tempering seed.

16. The method of claim 15, wherein the step of tempering occurs at a temperature in the range of about 28° C. to about 32° C.

17. The method of claim 11, wherein at least a portion of the cocoa solids and the chocolate compatible fat are provided as chocolate liquor and wherein the method further comprises the step of conching the mixture intermediate the steps of providing and refining.

18. The method of claim 11, wherein the step of forming includes at least one operation selected from the group consisting of rotary molding, sheeting, extrusion, depositing, drop rolling, stamping, frozen cone and panning.

19. A method for creating a confectionery product comprising:

providing a mixture comprising a chocolate compatible fat and a sweetener and containing less than 0.3% by weight emulsifiers; thereafter refining the mixture to form a powder having a predetermined average particle size; thereafter agitating the refined powder mixture at a temperature above the melting temperature of the chocolate compatible fat to form a dough; and thereafter solidifying the dough to form a confectionery product wherein the chocolate compatible fat is a tempering fat and wherein the method further comprises tempering the dough in the presence of greater than about 0.3% by weight tempering seed intermediate the steps of agitating and solidifying.

* * * * *